(12) United States Patent
Igawa et al.

(10) Patent No.: US 11,593,733 B2
(45) Date of Patent: Feb. 28, 2023

(54) PLAN COORDINATION APPARATUS AND PLAN COORDINATION METHOD

(71) Applicant: Hitachi, Ltd., Tokyo (JP)

(72) Inventors: Hiromi Igawa, Tokyo (JP); Motonobu Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1 day.

(21) Appl. No.: 17/214,975

(22) Filed: Mar. 29, 2021

(65) Prior Publication Data

US 2021/0365858 A1 Nov. 25, 2021

(30) Foreign Application Priority Data

May 25, 2020 (JP) .............................. JP2020-090440

(51) Int. Cl.
| | | |
|---|---|---|
| *G06Q 10/00* | (2012.01) | |
| *G06Q 10/0631* | (2023.01) | |
| *G06Q 30/0201* | (2023.01) | |
| *G06Q 10/0875* | (2023.01) | |

(52) U.S. Cl.
CPC . *G06Q 10/06313* (2013.01); *G06Q 10/06312* (2013.01); *G06Q 10/0875* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 2004/0107125 A1* | 6/2004 | Guheen | G06Q 99/00 705/319 |
| 2006/0059253 A1* | 3/2006 | Goodman | G06Q 10/10 709/223 |

(Continued)

FOREIGN PATENT DOCUMENTS

WO    2015/068231 A1    5/2015

OTHER PUBLICATIONS

Raza, Muhammad, System Reliability & Availability Calculations, Oct. 9, 2019, BMC Blogs, https://www.bmc.com/blogs/system-reliability-availability-calculations/, p. 1-23. (Year: 2019).*

*Primary Examiner* — Joseph M Waesco
(74) *Attorney, Agent, or Firm* — Mattingly & Malur, PC

(57) ABSTRACT

Provided is a plan coordination apparatus that swiftly coordinates plans between business operators regardless of presence or absence of product order placement/receipt-relation. The plan coordination apparatus includes a value chain management unit and a scheduling unit. The value chain management unit prepares value chain data, recalculates reliability of order placement/receipt-relation between the business operators each time a new track record of product order placement/receipt-relation is collected, updates the reliability, and assigns the reliability to the edge. The scheduling unit accepts a plan alteration request from one of the business operators to be managed, refers to automatically adjustable volumes of the product data, the value chain data, and the plan data, judges whether a related business operator can alter the plan, identifies an alternative business operator, gives a notification of the alteration of the plan to the business operator, and alters the plan data.

8 Claims, 10 Drawing Sheets

(56) References Cited

U.S. PATENT DOCUMENTS

| | | | |
|---|---|---|---|
| 2010/0161366 A1* | 6/2010 | Clemens | G06Q 30/06 705/7.29 |
| 2010/0205044 A1* | 8/2010 | Scheer | G06Q 10/08 705/28 |
| 2011/0295722 A1* | 12/2011 | Reisman | G06Q 30/0641 705/26.1 |
| 2016/0267417 A1 | 9/2016 | Tomiyama et al. | |
| 2017/0323403 A1* | 11/2017 | Johnson | G06Q 10/06314 |
| 2019/0207807 A1* | 7/2019 | Mikhail | H04L 41/145 |
| 2020/0134560 A1* | 4/2020 | Mclinden | G06T 17/05 |
| 2020/0134745 A1* | 4/2020 | Mclinden | G06Q 10/06313 |
| 2021/0173711 A1* | 6/2021 | Crabtree | G06F 16/9024 |

\* cited by examiner

FIG.5A

| NODE ID | BUSINESS OPERATOR NAME | BUSINESS OPERATOR TYPE ID | PRODUCT ID |
|---|---|---|---|
| N1 | BUSINESS OPERATOR 1 | T2(Assembly) | D1 |
| N2 | BUSINESS OPERATOR 2 | T1(Transport) | D2 |
| N3 | BUSINESS OPERATOR 3 | T3(Supply) | D3 |
| ... | ... | ... | ... |
|  |  |  |  |
|  |  |  |  |

FIG.5B

| EDGE ID | CALL SOURCE NODE ID | CALL DESTINATION NODE ID | RELIABILITY |
|---|---|---|---|
| E1 | N1 | N2 | 10 |
| E2 | N2 | N3 | – |
| E3 | N3 | N4 | 3 |
| ... | ... | ... | ... |
|  |  |  |  |
|  |  |  |  |

FIG.6

| PROVISION SOURCE NODE ID | PROVISION DESTINATION NODE ID | PRODUCT ID | MEAN LEAD TIME | LATEST DELIVERY TRACK RECORD VOLUME | DATA UPDATE CYCLE | DEFECT RATE (QUALITY) |
|---|---|---|---|---|---|---|
| N1 | N2 | 1 | 3 | 10 | 24h | 0.5 |
| N2 | N3 | 11 | 10 | 5 | 24h | 0.2 |
| N3 | N4 | 3 | 5 | 9 | 1h | 0.7 |
| ... | ... | ... | ... | ... | ... | ... |
| | | | | | | |
| | | | | | | |

| SCHEDULE ID (1131a) | PRODUCT ID (1131b) | PROVISION SOURCE BUSINESS OPERATOR ID (1131c) | PROVISION DESTINATION BUSINESS OPERATOR ID (1131d) | DELIVERY VOLUME (1131e) | RELIABILITY (1131f) | DELIVERY DATE (1131g) |
|---|---|---|---|---|---|---|
| E1 | 50 | A | B | 10 | 10 | 1/20 |
| E2 | 20 | | | | | |
| E3 | 12 | | | | | |
| ... | | | | | | |
| | | | | | | |
| | | | | | | |

| BUSINESS OPERATOR NAME (1132a) | PRODUCT NAME (1132b) | DELIVERY DATE (1132c) | SCHEDULED PRODUCTION VOLUME (1132d) | AUTOMATICALLY ADJUSTABLE VOLUME (1132e) |
|---|---|---|---|---|
| A | COMPONENT C | 1/5 | 10 | 1 |
| A | COMPONENT D | 1/5 | 20 | 5 |
| B | COMPONENT C | 1/5 | 30 | 5 |
| ... | | | | |
| | | | | |
| | | | | |

(1132f)

PLAN COORDINATION APPARATUS AND PLAN COORDINATION METHOD

CROSS-REFERENCE TO RELATED APPLICATION

The present application claims priority from Japanese application JP2020-090440, filed on May 25, 2020, the contents of which is hereby incorporated by reference into this application.

BACKGROUND OF THE INVENTION

1. Field of the Invention

The present invention relates to a plan coordination apparatus and a plan coordination method for swiftly drafting a production plan involving a plurality of business operators and making an alteration to the production plan.

2. Description of the Related Art

In manufacturing sector, a plurality of management organizations are often involved in production processes of products, and an alteration made to one plan of a management organization may result in affecting other plans.

For example, in the case where a request is made from a distributor to increase product supplies in response to an increase in demand, an assembler is required not only to adjust its own assembly schedule but also make adjustments with a component manufacturer that receives component supplies from other company before giving a delivery date. Further, the component manufacturer gives a reply as to whether it can alter the schedule by making adjustments with other component manufacturers that supply subordinate components to itself, which is time-consuming and makes it difficult to give a delivery date swiftly.

In order to solve the above problem, PCT Patent Publication No. WO2015/068231 recites: "Proposed is a plan coordination system that allows to perform a process of achieving consistency between plans in an efficient and swift manner while simultaneously maintaining information confidentiality as appropriate among different organizations managing plans coordinated with each other. The plan coordination system includes an arithmetic unit executing: a process of creating public data from definition data of each plan, accepting, among process steps indicated by this public data, a user definition of information to be coordinated between the plans, applying the user definition to definition data of a corresponding plan, and preparing a plan coordination model; a process of giving a notification of the data to a management apparatus for other plan to coordinate with in the coordination relation when an alteration event occurs regarding the definition data, altering the plan coordination model on the basis of a preparation result of other plan reflecting the alteration event, and giving a notification of the altered data to the management apparatus for other plan having the coordination relation with the plan that has been altered as a result of the alteration; and a process of outputting preparation results of respective plans when the all plans are complete."

PCT Patent Publication No. WO2015/068231 describes a planning model for business operators whose plans are directly linked and does not take into consideration about coordination between a plurality of business operators or coordination between non-linked business operators.

PCT Patent Publication No. WO2015/068231 is premised on the fact that real-time data is available at the time of plan coordination. In the case where a data quality and a data acquisition frequency or cycle are not as anticipated, a departure from a current status may occur.

PCT Patent Publication No. WO2015/068231 does not describe any processes to be performed in the case where an event occurs that prevents coordination (there is no solution to fulfill the plan).

In light of the foregoing, the present invention provides plan coordination means that, when a business operator faces a request to alter a production plan, not only swiftly judging whether a supplier having a track record of product order placement/receipt-relation to or from the business operator can alter a plan, but also identifying even a supplier having no track record of product order placement/receipt-relation to or from the business operator as an alternative business operator by using reliability based on a track record of product order placement/receipt-relation to or from other business operator as a judgement criterion for coordination.

SUMMARY OF THE INVENTION

In a preferred example of the present invention, a plan coordination apparatus includes a first database, a second database, a third database, value chain management means, and scheduling means. The first database registers each business operator to be managed as a node having a business operator type and product information and stores value chain data that connects the nodes to each other by using an edge that is assigned a reliability index value for order placement/receipt-relation in association with a track record of order placement/receipt-relation between the business operators. The second database stores components included in a new product and quantities of the components as product data in BOM format, the components and quantities of the components being reported by each of the business operators before a production plan of the new product is drafted. The third database stores plan data disclosing a product delivery plan between the business operators and automatically adjustable volumes indicating a maximum possible increase in production volume in addition to a scheduled production volume, the product delivery plan and the automatically adjustable volumes being reported by each of the business operators when a schedule is drafted to produce and deliver (e.g., transport) a product. The value chain management means prepare value chain data, recalculate reliability of order placement/receipt-relation between the business operators each time a new track record of product order placement/receipt-relation is collected, updates the reliability, and assign the reliability to the edge. The scheduling means accept a plan alteration request from one of the business operators to be managed, refer to automatically adjustable volumes of the product data, the value chain data, and the plan data from the respective databases, judge whether a related business operator can alter the plan, identify an alternative business operator, give a notification of the alteration of the plan to the business operator, and alter the plan data in the third database.

As another feature of the present invention, the value chain management means of the plan coordination apparatus register each of the business operators to be managed in a node information table of the first database together with final product ID of each of the business operators, are activated at a cycle at which track record data is collected, define, in a case where a new track record of product order placement/receipt-relation between the business operators is collected, a new edge connecting the nodes of the two business operators to each other in an edge information table of the first database, and recalculate reliability of order placement/receipt-relation between the business operators on the basis of the track record data, update the reliability, and assign the reliability to the edge in the case where a new track record of order placement/receipt-relation is collected between existing business operators.

The plan coordination apparatus of the present invention has an advantageous effect of allowing a highly reliable plan to be drafted with minimal calculations even in the case where a plan cannot be fulfilled between related business operators having a track record.

BRIEF DESCRIPTION OF THE DRAWINGS

FIG. 5A is a diagram illustrating an example of a node information table stored in a value chain data DB;

FIG. 5B is a diagram illustrating an example of an edge information table stored in the value chain data DB;

FIG. 6 is a diagram illustrating an example of a track record data table stored in a track record data DB;

FIG. 7A is a diagram illustrating a schedule data table stored in a plan data DB;

FIG. 7B is a diagram illustrating an automatically adjustable data table stored in the plan data DB;

DESCRIPTION OF THE PREFERRED EMBODIMENTS

A plan coordination apparatus and a plan coordination method for realizing the present invention will be described below with reference to drawings.

Embodiment 1

Figure 1:
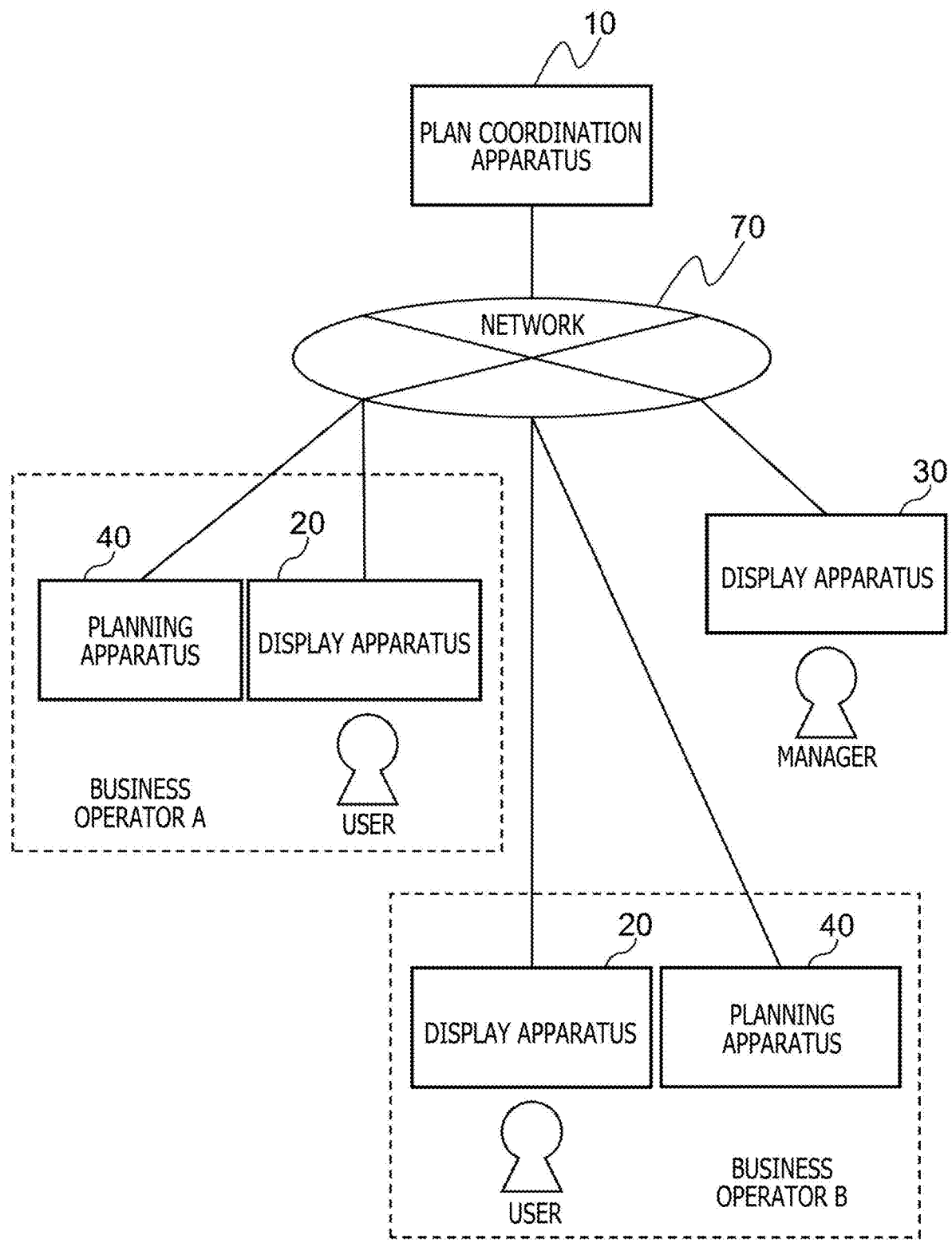
FIG. 1 is a diagram illustrating a configuration example of a system connecting a plan coordination apparatus to planning apparatuses of respective business operators subject to plan coordination in embodiments of the present invention.

FIG. 1 is a system configuration diagram in which a plan coordination apparatus 10 of the present embodiment and planning apparatuses 40 of respective target business operators are connected to each other via a network 70. Display apparatuses 20 for respective users and a display apparatus 30 of a manager are also connected to each other via the network.

Figure 2:
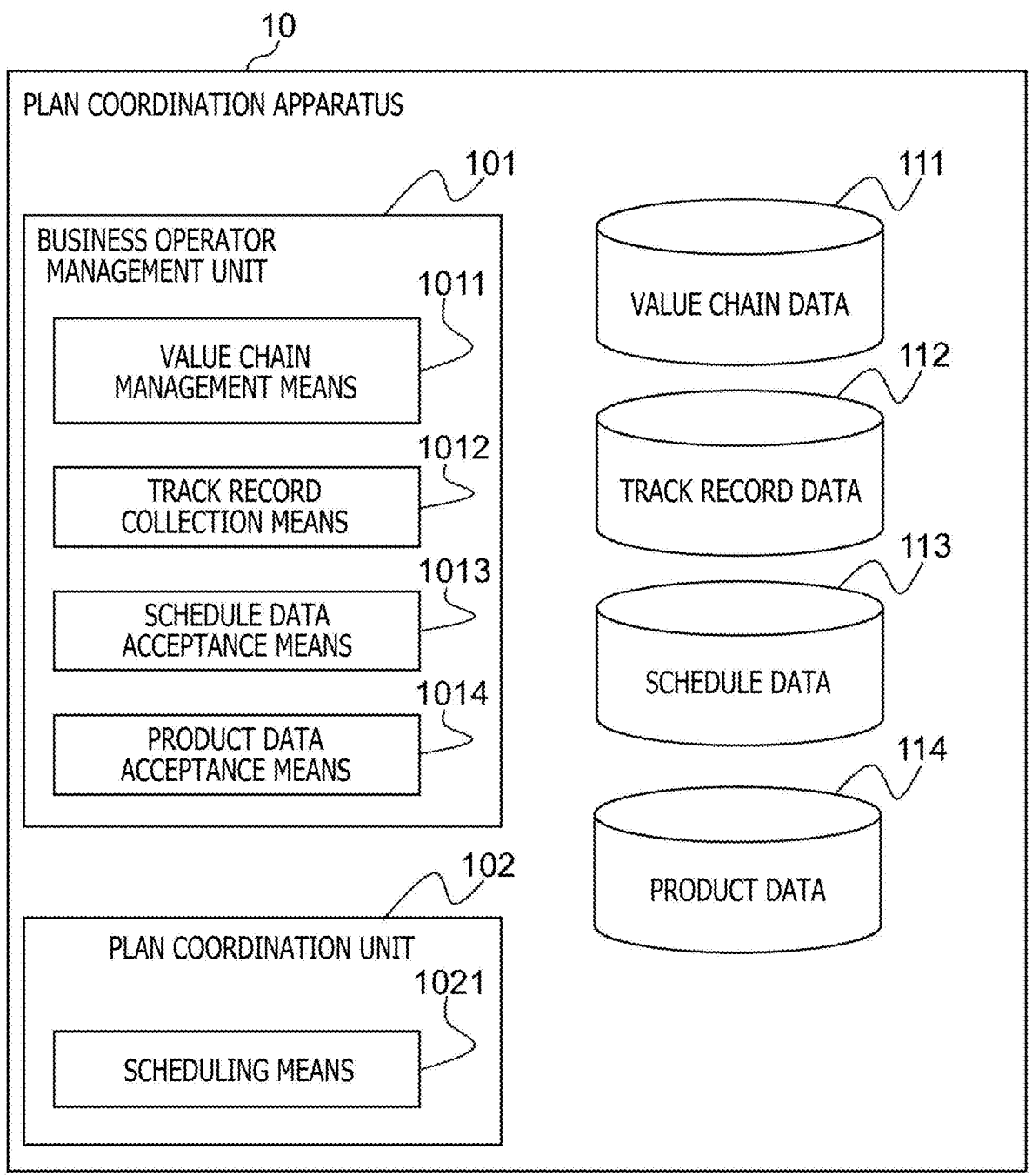
FIG. 2 is a functional configuration diagram of the plan coordination apparatus.

FIG. 2 illustrates a functional configuration diagram of the plan coordination apparatus of the present embodiment. Functional units can be broadly divided into two parts, namely, a business operator management unit 101 and a plan coordination unit 102. The business operator management unit 101 includes value chain management means 1011, track record collection means 1012, schedule data acceptance means 1013, and product data acceptance means 1014. The value chain management means 1011 create a directed graph of business operators on the basis of information regarding product transactions between business operators to be managed and links between business operators representing delivery relations, and store the directed graph in a value chain data DB 111. The track record collection means 1012 collect information regarding product transactions between the business operators to be managed and delivery track record information at a specified cycle, and record the information to a track record data DB 112. The schedule data acceptance means 1013 accept schedule data created by the respective business operators to be managed from the respective business operators when the schedule data is created or updated, and store the schedule data in a schedule data DB 113. The product data acceptance means 1014 accept product data regarding quantities of components included in products shipped and delivered by the respective business operators to be managed, and store the product data in a product data DB 114. The plan coordination unit 102 includes scheduling means 1021 that draft alterations to production schedule of related business operators arising as a result of an alteration to a production schedule of a certain business operator.

Figure 3:
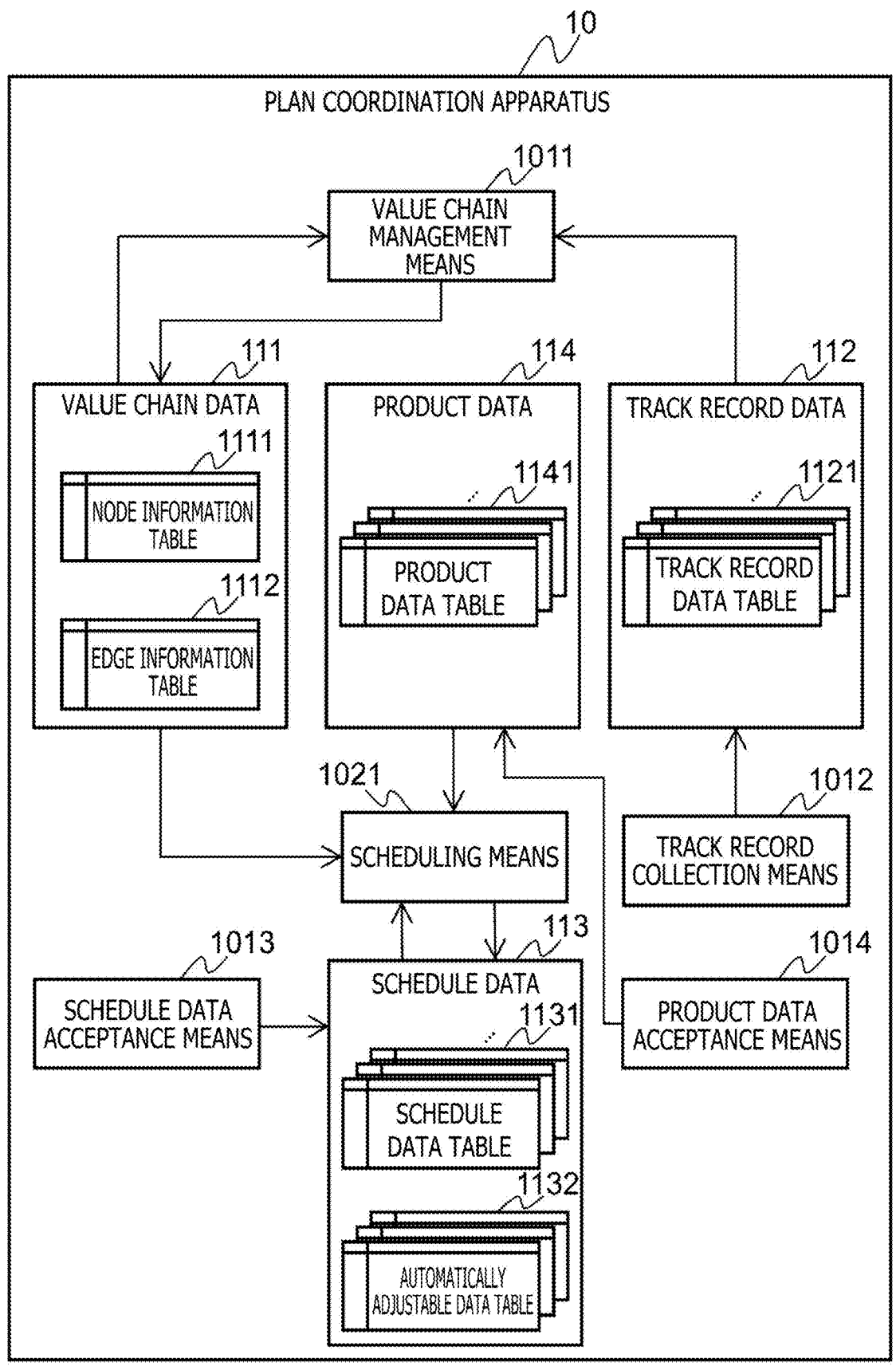
FIG. 3 is a functional block diagram of the plan coordination apparatus.

FIG. 3 illustrates a functional block diagram of the plan coordination apparatus 10.

The value chain management means 1011 of the plan coordination apparatus of the present embodiment register each business operator to be managed in a node information table 1111 of the value chain data DB 111 together with its final product ID. The product data acceptance means 1014 accept a quantity of a component included in a product as product data in BOM (Bill Of Material) format and register the product data in the product data DB 114 when a new product is planned by each business operator.

The schedule data acceptance means 1013 accept a schedule data report from each business operator when the business operator drafts a schedule to produce and deliver (e.g., transport) a product (or component and the like), and record the report to a schedule data table 1131 and an automatically adjustable data table 1132 of the schedule data DB 113.

The track record collection means 1012 collect track record data related to order placement/receipt-relation between business operators at a specified cycle, and record the track record data to the track record data DB 112. The value chain management means 1011 refer to the track record data in the track record DB 112 and define, in the case where a new track record of product order placement/receipt-relation between business operators is collected, an edge connecting nodes of the two business operators to each other in an edge information table 1112 of the value chain data DB 111. Reliability of order placement/receipt-relation between the business operators is calculated and assigned to each edge of the edge information table 1112. The reliability is recalculated and updated each time new track record data is collected.

The scheduling means 1021 accept a plan alteration request from a certain business operator to be managed, refer to automatically adjustable volumes of target product data, value chain data, and schedule data, judge whether the plan can be altered, identify an alternative business operator, give a notification of the plan alteration to each business operator, and alter the schedule data.

Figure 4:
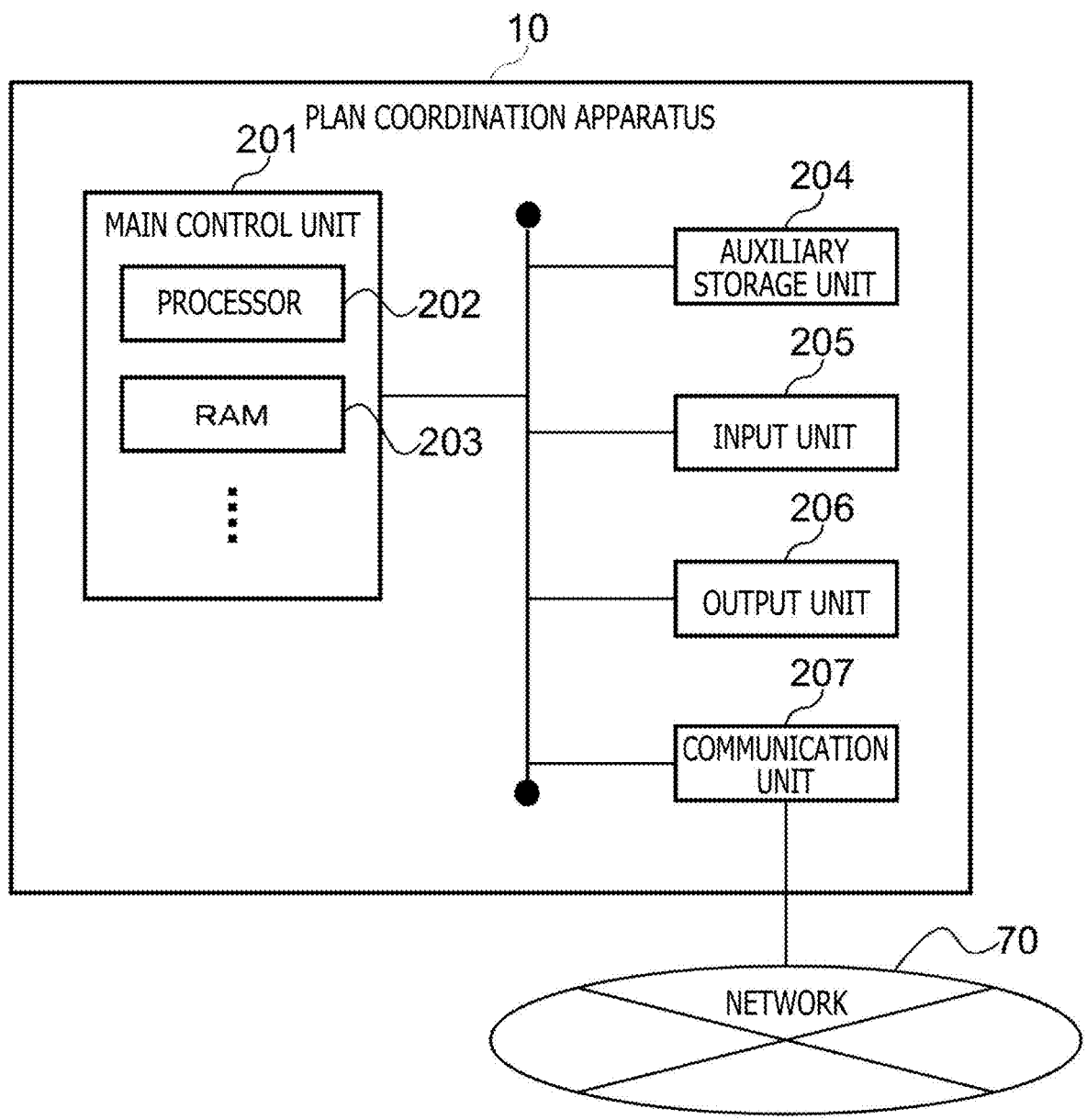
FIG. 4 is a diagram illustrating an example of a hardware configuration of the plan coordination apparatus.

FIG. 4 is a diagram illustrating an example of a hardware configuration of the plan coordination apparatus 10. The plan coordination apparatus 10 can be configured on a general-purpose computer and includes a main control unit 201, an auxiliary storage unit 204, an input unit 205, an output unit 206, and a communication unit 207. The main control unit 201 includes a processor (CPU) 202, a RAM (Random Access Memory) 203, and the like. The auxiliary storage unit 204 includes a ROM (Read Only Memory), an HDD (Hard Disk Drive), an SSD (Solid State Drive) using a flash memory or other type of memory, and the like, an input unit 205, an output unit 206, and a communication unit 207. The input unit 205 includes input devices such as a keyboard and a mouse. The output unit 206 includes a display apparatus such as LCD (Liquid Crystal Display) or organic EL display and a variety of output apparatuses. The communication unit 207 includes an NIC (Network Interface Card) or the like.

The communication unit 207 is connected to the planning apparatuses 40 and the display apparatuses 20 of the respective target business operators to be managed, the display apparatus 30 of the manager, and the like via a network 70 such as a wired network or wireless network.

The main control unit 201 realizes each functional unit illustrated in FIG. 2 by loading a plan coordination program, stored in the auxiliary storage unit 204, into the RAM 203 and executing the program with the processor (CPU) 202.

FIGS. 5A and 5B illustrate examples of value chain data stored in the value chain data DB 111. For example, a plurality of business operators involved in a certain product 'a' form a group including a plant (business operator 'a') assembling the product 'a,' a deliverer (business operator 'c') transporting the product 'a' to a distributor (business operator 'b'), suppliers 'd' and 'e' (business operators 'd' and 'e') supplying components 'b' and 'c' that will be built into the product 'a' to the plant, a supplier 'f' (business operator 'f') supplying subordinate components to the supplier 'd', and the like. The business operators belonging to this group are referred to as linked business operators, and each business operator is assigned to a node, thus providing value chain data, a directed graph representing distribution of goods between the business operators with edges.

FIG. 5A illustrates an example of the node information table 1111 of value chain data. The node information table 1111 has a node ID (1111a), a business operator name (1111b), a business operator type ID (1111c), and a product ID (1111d) as data items. A data record 1111e in a third row is node information that includes "N3" as the node ID, "business operator 3" as the business operator name, "T3" supplier as the business operator type ID, and "D3" product (or component and the like) as the product ID.

FIG. 5B illustrates an example of the edge information table 1112 of value chain data. The edge information table 1112 has an edge ID (1112a), a call source node ID (1112b), a call destination node ID (1112c), and reliability (1112d) as data items.

A call source node represents a source node in a directed graph connected by an edge and corresponds to a business operator that delivers (e.g., transports) a product (or component and the like). A call destination node represents a destination node in a directed graph connected by an edge and corresponds to a business operator to which a product (or component and the like) is delivered (e.g., transported).

The reliability is calculated as an index for assessing the extent to which the demand of the call destination node business operator has been fulfilled on the basis of track record data of past product (or component and the like) deliveries (e.g., transports) to the call destination node business operator. The reliability calculation formula is defined by the following formula:

$$\text{Reliability} = c1 \times (\text{Delivery date-meeting level}) + c2 \times (\text{Defect rate}) + c3 \times (\text{Data update level}) \quad \text{(Formula 1)}$$

where the delivery date-meeting level represents the ratio of deliveries (e.g., transports) of products (or components and the like) meeting the delivery dates made by the call source node business operator in the past. (For example, this value is normalized such that it falls within a zero-to-one range).

The defect rate represents the ratio of inclusions of defects found as a result of quality inspection performed by the call destination node business operator following reception of products (or components and the like) delivered (transported) in the past. The rate may be increased by the number of defects. (For example, this value is normalized such that it falls within a zero-to-one range).

The data update level is calculated to be a value dependent upon the number of track records of deliveries (e.g., transports) of products (or components and the like) made by the call source node business operator to the call destination node business operator in the past. (For example, this value is normalized such that it falls within a zero-to-one range).

c1, c2, and c3 are factors equivalent to weights corresponding to respective elements of the reliability calculation process.

A reliability is calculated for each product (or component and the like), as many reliabilities as the number of combinations of a call source node business operator and a call destination node business operator are calculated and assigned to each edge. The data record 1112e in a first row of the edge information table 1112 is edge information that includes "E1" as the edge ID, "N1" as the call source node ID, "N2" supplier as the call destination node ID, and "10" as the reliability.

FIG. 6 illustrates an example of track record data stored in the track record data DB 112. A track record data table 1121 has a provision source node ID (1121a) indicating a business operator that delivers (e.g., transports) a product (or component and the like), a provision destination node ID (1121b) indicating a business operator to which (e.g., transports) a product (or component and the like) is delivered, a product ID (1121c) identifying a product (or component and the like), a mean lead time 1121d based on track record of past deliveries and the like, a latest delivery track record volume 1121e, a data update cycle 1121f specifying a cycle at which track record data is updated (not updated if there is no alteration), and a defect rate (quality) 1121g based on information regarding inspection performed on products (or components and the like) of past delivery track records.

The track record collection means 1012 collect a track record of product order placement/receipt-relation between business operators every specified update cycle, and record the data to the track record data DB 112. In order to calculate reliability of order placement/receipt-relation between the business operators, the track record collection means 1012 collect delivery date-meeting information, defect rate information, placed/received order counts, and other data, and record such data together with past history.

FIGS. 7A and 7B illustrate examples of plan data stored in the schedule data DB 113. For example, when drafting a schedule to produce and deliver (e.g., transport) a product (or a component and the like), each business operator reports the schedule to the plan coordination apparatus 10. The schedule data acceptance means 1013 of the plan coordination apparatus 10 record or update the data record to the schedule data table 1131 in FIG. 7A and the automatically adjustable data table 1132 in FIG. 7B on the basis of schedule data reported by each business operator.

FIG. 7A illustrates an example of schedule data stored in the schedule data table 1131 of the schedule data DB 113. The schedule data table 1131 has, as data items, a schedule ID (1131a) identifying a schedule, a product ID (1131b) identifying a product (or component and the like), a provision source business operator ID (1131c) identifying a business operator producing and delivering (e.g., transporting) a product (or component and the like), a provision destination business operator ID (1131d) to which a product (or component and the like) is delivered (e.g., transported), a delivery volume 1131e, a reliability 1131f that includes, in the presence of a track record of several deliveries (e.g., transports) of the product (or component and the like) in the past, a reliability value stored in a field of the reliability 1112d of the data record stored in the edge information table 1112 of the value chain data DB 111 and is left blank in the case of a completely new plan, and a delivery date 1131g that includes a delivery date of the schedule.

FIG. 7B illustrates an example of schedule data stored in the automatically adjustable data table 1132 of the schedule data DB 113. The automatically adjustable data table 1132 has, as data items, a business operator name 1132a delivering (e.g., transporting) a product (or component and the like), a product name 1132b of a product (or component and the like), a delivery date 1132c, a scheduled production volume 1132d, and an automatically adjustable volume 1132e indicating a maximum possible increase in production volume in addition to the scheduled production volume.

The automatically adjustable volume 1132e indicates a maximum possible increase in production (or transport) volume in addition to a scheduled production (or transport) volume and is disclosed by each business operator by self-declaration in schedule data reported to the plan coordination apparatus 10 when a schedule is drafted to produce and deliver (e.g., transport) a product (or component and the like).

A data record 1132f in a second row of the automatically adjustable data table 1132 is plan data that includes "A" as the business operator name, "Component D" as the product name, "1/5" as the delivery date, "20" as the scheduled production volume, and "5" as the automatically adjustable volume meaning the production volume can be increased up to "5."

The product data acceptance means 1014 of the plan coordination apparatus 10 accept a report of quantities of components included in a product as product data in BOM (Bill Of Material) format and register the report in the product data DB 114 when each business operator drafts a production plan to produce a new product.

Although not illustrated, product data stored in the product data DB 114 is in a list form depicting a total count of each component included in the product to be shipped from each business operator as a final product. A data record of each component has, as data items, an article name (product name and product ID), a model, a manufacturer name (business operator name and business operator ID), and a volume.

For example, for a supplier supplying a component, the component is a final product of that supplier. Therefore, the supplier (business operator) reports product data of the component (product). The product data acceptance means 1014 register the product data in a product data table 1141 of the product data DB 114. For example, the product data is in BOM format including subordinate components.

Figure 8:
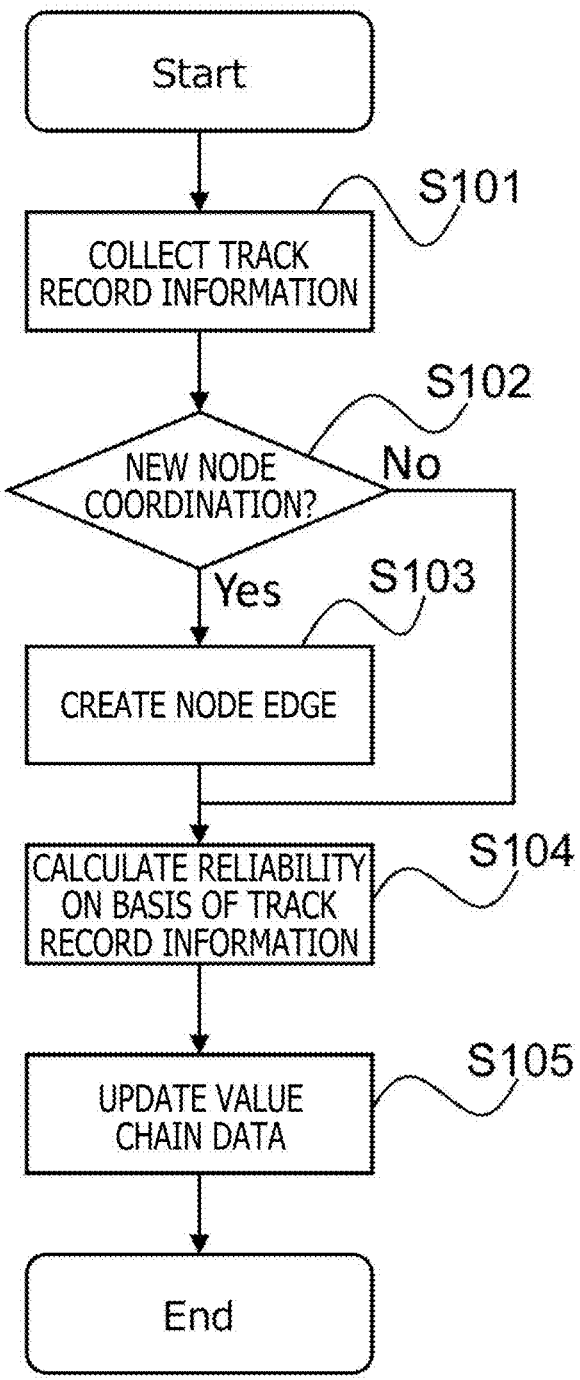
FIG. 8 is an operation flowchart of value chain management means of the plan coordination apparatus.

FIG. 8 illustrates an operation flow of the value chain management means 1011 of the plan coordination apparatus 10. The value chain management means 1011 are activated every predetermined cycle to perform a series of processes. The term "predetermined cycle" refers to a cycle for collecting track record data every data update cycle specified in advance for each data record in the track record data table 1121.

In step S101, the value chain management means 1011 activate the track record collection means 1012, and the track record collection means 1012 collect track record information by inquiring the provision source node ID business operator and the provision destination node ID business operator having the data update cycle about track record information.

In step S102, the value chain management means 1011 judge that there is a new node coordination if the track record data collected in step S101 has a new combination of a provision source node ID, a provision destination node ID, and a product ID, and proceeds to step S103. The value chain management means 1011 proceed to step S104 if the track record data has a hitherto existing node coordination.

In step S103, the value chain management means 1011 create a data record of new edge information in the edge information table 1112 of the value chain data DB 111 from the track record data judged as having a new node coordination in step S102. The value chain management means 1011 create a new edge ID in a field of the edge ID (1112a) of the new data record and enter the provision source node ID value in a field of the call source node ID (1112b) and the provision destination node ID value in a field of the call destination node ID (1112c).

In step S104, the value chain management means 1011 judge whether different and new track record data has been added by comparing, on the basis of the track record data collected in step S101, the newly collected track record data with track record data required to calculate Formula (1) including a delivery date-meeting level, a defect rate, and a data update level. In the absence of new track record data, the reliability remains unchanged. As a result, the value chain management means 1011 do not perform the calculation. In the presence of new track record data, the value chain management means 1011 calculate the reliability by including past track record data.

It should be noted that in the case where the value chain management means 1011 judge that there is a new node coordination, there is no previously calculated reliability. As a result, the value chain management means 1011 calculate a reliability on the basis of newly collected track record data.

In step S105, the value chain management means 1011 write the calculated reliability value to the field of the reliability 1112d in the data record of the edge ID of the edge information table 1112 of the value chain data DB 111 for update in the case where the reliability has been calculated in step S104.

Figure 9:
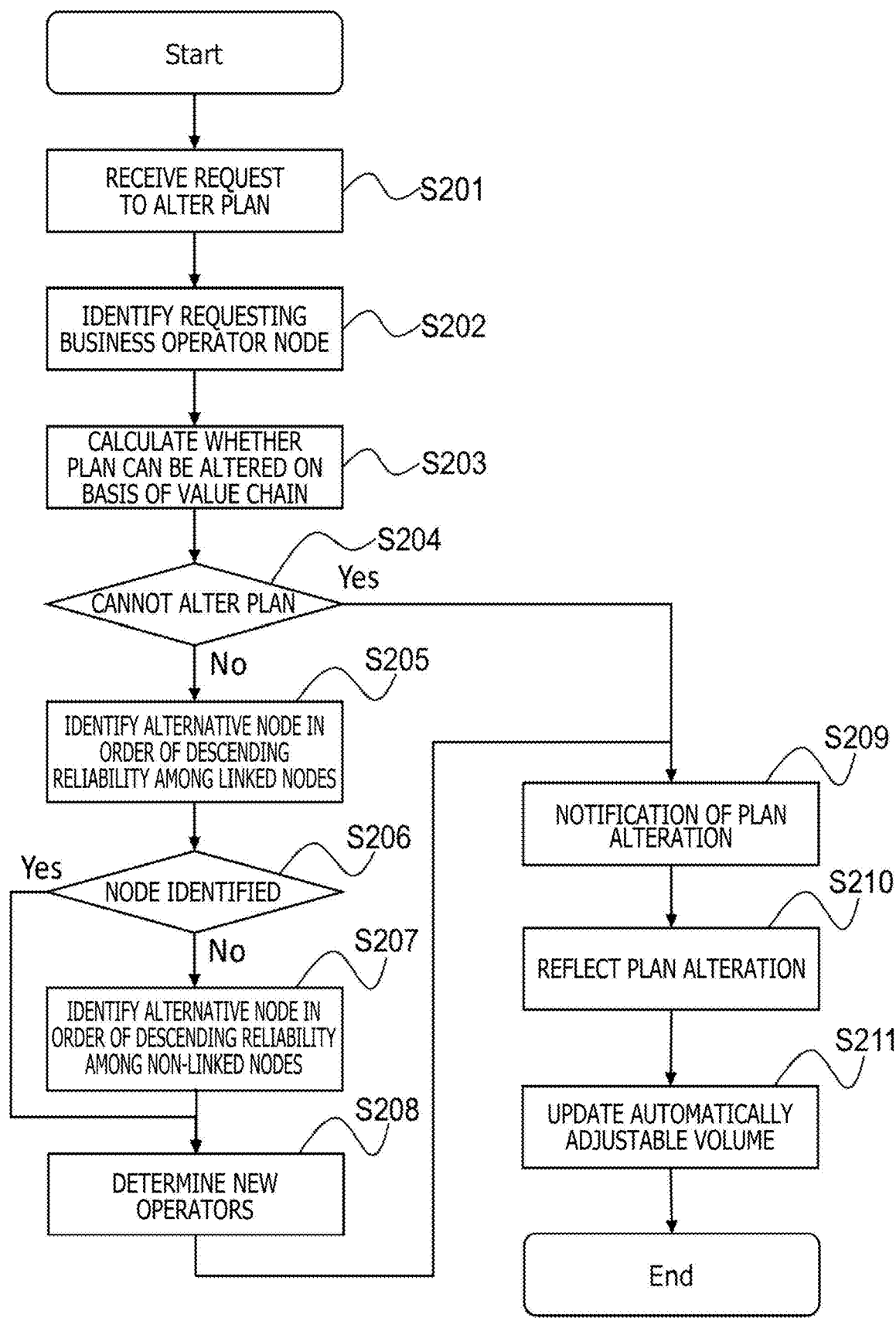
FIG. 9 is an operation flowchart of scheduling means of a plan coordination unit of the plan coordination apparatus.

FIG. 9 is an operation flow of the scheduling means 1021 of the plan coordination unit 102 of the plan coordination apparatus 10. The scheduling means 1021 are activated, for example, when a plan alteration request arrives from a certain business operator to be managed.

In step S201, the scheduling means 1021 receive a plan alteration request of a business operator requesting a plan alteration in light of the schedule data stored in the schedule data DB 113.

In step S202, the scheduling means 1021 identify the node ID (1111a) of the business operator requesting a plan alteration on the node information table 1111 of the value chain data DB.

In step S203, assuming, for example, that an assembler A made an alteration request in step S203 and that this alteration is to produce five more products B, it becomes clear, with reference to the product data of the product B of the business operator A registered in the product data DB 114, that it is necessary to place an additional order of five pieces of each component included in the product B.

Each business operator (supplier) delivering each component included in the product B to the business operator A can be found by searching the track record data 1121. Therefore, the scheduling means 1021 search the automatically adjustable data table 1132 of the schedule data DB 113 for plans of the respective business operators (suppliers) to produce respective components included in the product B, thus confirming the business operator name, the delivery date in the data record of the product name, and the automatically adjustable volume. As a result of search for automatically adjustable data of the business operator D (supplier D) delivering a certain component C included in the product B to the business operator A, if its delivery date and automatically adjustable volume meet both the delivery date and the additional order volume, i.e., five additional pieces of the component C, resulting from a plan alteration of the business operator A, the scheduling means 1021 judge that the plan can be altered.

Alternatively, in the case where a plurality of business operators (suppliers), not just the business operator D (supplier D), deliver the component C included in the product B to the business operator A, and if the total of the automatically adjustable volumes by the respective business operators (suppliers) meets the additional order volume, i.e., five additional pieces of the component C, resulting from a plan alteration of the business operator A, and if the delivery date is met at the same time, the scheduling means 1021 judge that the plan can be altered.

As described above, the scheduling means 1021 judge, for each component included in the product B, whether the total of the automatically adjustable volumes by the respective business operators (suppliers) delivering the respective components to the business operator A meets the additional order volume, i.e., five additional pieces of the component C, resulting from a plan alteration of the business operator A, and whether the delivery date is met (the plan can be altered) or not (the plan cannot be altered).

In step S204, the scheduling means 1021 proceed to step S205 if there is even one component whose schedule cannot be altered and proceeds to step S209 when the schedules of all the components can be altered as a result of a judgment made for each component included in the product B in step S203 as to whether the plan can be altered.

In step S205, as a result of a judgment made for each component included in the product B in step S203 as to whether the schedule can be altered, the scheduling means 1021 perform the following processes on a component E (normally, there are a plurality of component types) whose schedule has been judged as unalterable.

The scheduling means 1021 make a list of the business operators capable of manufacturing the component E from the node information table 1111 of value chain data and identifies, among these business operators, a business operator F (a plurality of business operators may be identified) whose past track record of delivery to the business operator A (the fact that the business operator F is a linked node) has been confirmed from the edge information table 1112 of value chain data although a most recent track record of delivery is not discovered from the track record data table 1121. If one or more business operators F are identified, these business operators are identified, in order of decreasing reliability in edge information table 1112, as candidates for alternative nodes to which an additional order of five pieces of the component E can be placed.

As described above, the scheduling means 1021 judge, for all the components E, whether the business operator F is available as a candidate for alternative node and selects one or more business operators F identified as candidates for alternative nodes.

In step S206, the scheduling means 1021 proceed to step S208 if the business operators F have been identified as candidates for alternative nodes for all the components E in step S205 and proceeds to step S207 if no business operator F has been identified as a candidate for alternative node in step S205.

In step S207, the scheduling means 1021 perform the following processes on a component G (normally, there are a plurality of component types) for which no business operator F has been identified as a candidate for alternative node.

The scheduling means 1021 make a list of the business operators capable of manufacturing the component G from the node information table 1111 of value chain data and identifies, among these business operators, a business operator H (a plurality of business operators may be identified) whose track record of delivery of the component G to other business operators has been confirmed from the edge information table 1112 of value chain data although the business operator H has no past track record of delivery to the business operator A (the fact that the business operator H is a non-linked node). If one or more business operators H are identified, these business operators are identified, in order of decreasing reliability in edge information table 1112, as candidates for alternative nodes to which an additional order of five pieces of the component G can be placed.

As described above, the scheduling means 1021 judge, for all the components G, whether the business operator H is available as a candidate for alternative node and selects one or more business operators H identified as candidates for alternative nodes.

In step S208, the scheduling means 1021 determine, as business operators for the plan alteration, the business operator D whose schedule has been judged in step S203 as alterable within the bounds of the automatically adjustable volume for an additional order of the component C, the business operator F identified in step S205 as a candidate for alternative node to which an additional order of the component E can be placed, and the business operator H identified in step S207 as a candidate for alternative node to which an additional order of the component G can be placed.

In step S209, the scheduling means 1021 notify the business operator A that has requested a plan alteration that the plan can be altered and a request to send data about an altered plan, and notify the planning apparatuses 40 of the business operators judged in step S203 as capable of altering the plan, of a request to alter the plan for an additional order within the bounds of the automatically adjustable volume.

The scheduling means 1021 also notify the business operators selected in steps S205 and S207 as candidates for alternative nodes to which an additional order can be placed, of a request to send newly drafted plan data.

In step S210, the scheduling means 1021 accept plan data from the planning apparatuses 40 of the respective business operators notified, in step S209, of a request to send altered plan data or newly drafted plan data, and alter data records in the schedule data table 1131 and the automatically adjustable data table 1132 of the schedule data DB 113 or newly record the plan data, for plan alteration.

In step S211, the scheduling means 1021 write the most recent automatically adjustable volume reported from each business operator to the field of the automatically adjustable volume 1132e of the automatically adjustable data table 1132, according to the plan data accepted from each business operator in step S210, thus terminating its processes.

Embodiment 2

Figure 10A:
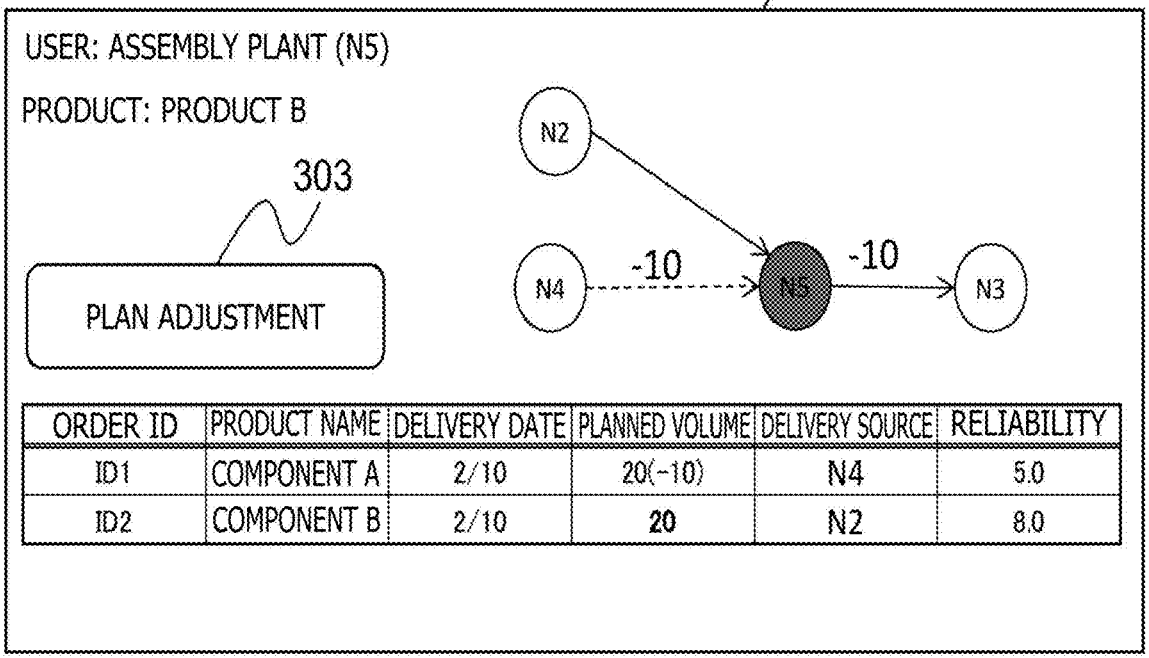
FIG. 10A is a diagram illustrating an example of a screen where a user enters a plan alteration request to the plan coordination apparatus.
Figure 10B:
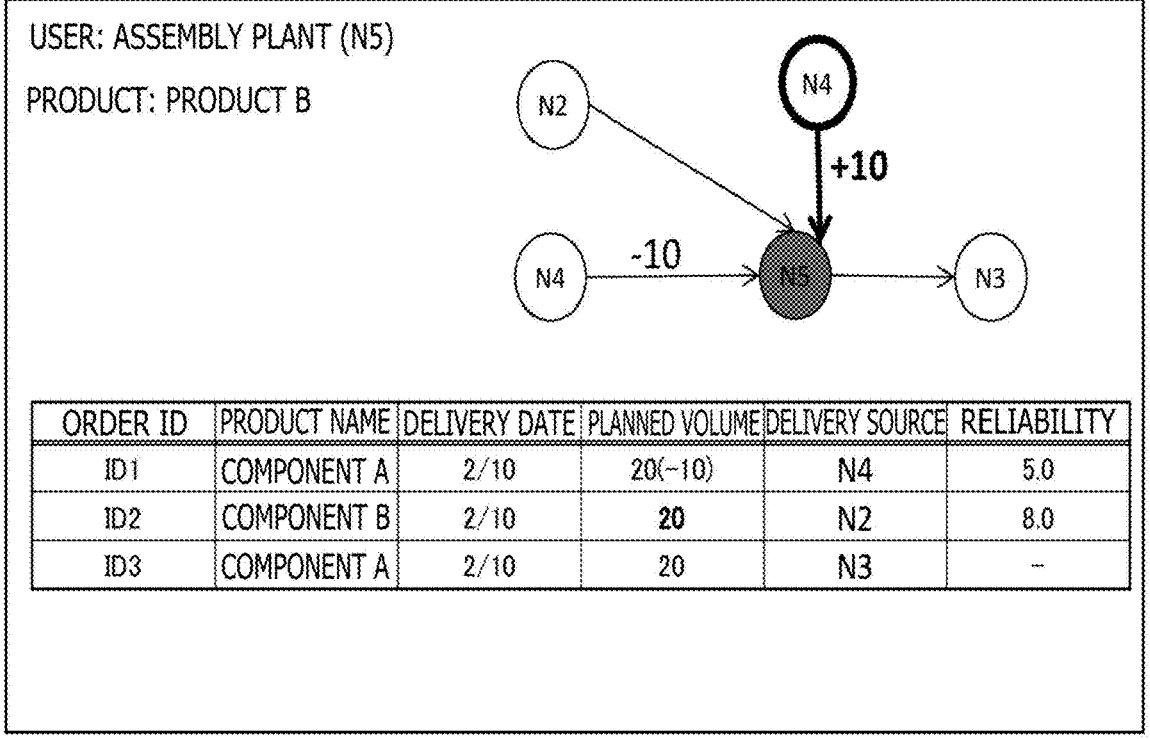
FIG. 10B is a diagram illustrating an example of a screen where the plan coordination apparatus reports adjustment results following plan coordination to the user.

FIGS. 10A and 10B are diagrams illustrating, respectively, an example of a screen where a user of each business operator enters a plan alteration request to the plan coordination apparatus 10 and an example of a screen where the plan coordination apparatus 10 reports an adjustment result following plan coordination to the user.

FIG. 10A is an example of a plan alteration request screen 301 where the user, an assembling plant (business operator N5), confirms that a planned volume will not be delivered as a result of alteration of the plan of a business operator N4 in relation to manufacture of the product B, and where the user (business operator N5) requests the plan coordination apparatus 10 to coordinate the plans by pressing a plan adjustment button 303. The screen displays a directed graph representing relations between the business operators centering around the user and influence (−10 in this figure) caused by the plan alteration near edges of the directed graph. This makes it possible for the user to readily confirm the relations between the business operators and the influence caused by the plan alteration. It should be noted that although this directed graph displays only the nodes of the business operators directly related to the user, it is also possible to further display the nodes of the business operators to which the displayed business operators (N2 and N3) are related. It is also possible to alter the manner of displaying edges such that a business operator that has altered its plan is easy to be found.

FIG. 10B illustrates an example of a screen 302 where the scheduling means 1021 of the plan coordination apparatus 10 accept a plan alteration request, confirm that the business operator N3 can fill the shortage from the business operator N4, proceed with plan coordination, and report an adjustment result. Since a new business operator is involved in this case, such a business operator has, for example, a thick border around it for identification. As soon as a track record of delivery is gained, reliability is assigned.

What is claimed is:

1. A plan coordination apparatus comprising:
a first database registering each business operator to be managed as a node including a business operator type and product information and storing value chain data that connects the nodes to each other by using an edge that is assigned a reliability index value for order placement/receipt-relation in association with a track record of order placement/receipt-relation between the business operators;
a second database storing components included in a new product and quantities of the components as product data in Bill of Material (BOM) format, the components and quantities of the components being reported by each of the business operators before a production plan of the new product is drafted;
a third database storing plan data disclosing a product delivery plan between the business operators and automatically adjustable volumes indicating a maximum possible increase in production volume in addition to a scheduled production volume, the product delivery plan and the automatically adjustable volumes being reported by each of the business operators when a schedule is drafted to produce and deliver a product; and
a processor configured to:
recalculate reliability of order placement/receipt-relation between the business operators each time a new track record of product order placement/receipt-relation is collected, update the reliability, and assign the reliability to the edge;
accept a plan alteration request from one of the business operators to be managed, refer to automatically adjustable volumes of the product data, the value chain data, and the plan data from the respective databases, judge whether a related business operator can alter the plan, identifying an alternative business operator, provide a notification of the alteration of the plan to the business operator, and alter the plan data in the third database;
automatically activate track record data collection and collect a track record of order placement/receipt-relation between the business operators at every individually specified update cycle for each of a plurality of track records, and simultaneously collect delivery date-meeting information, defect rate information, and placed/received order count data used to calculate reliability for order placement/receipt-relation between the business operators, and record these pieces of data to a fourth database together with past history;
automatically register each of the business operators to be managed in a node information table of the first database together with final product ID of each of the business operators;
automatically define, in a case where a new track record of product order placement/receipt-relation between the business operators is collected, a new edge connecting the nodes of the business operators to each other in an edge information table of the first database; and
each time a new track record of order placement/receipt-relation is collected between existing business operators, iteratively recalculate reliability of order placement/receipt-relation between the business operators on a basis of the track record data, iteratively update the reliability, and iteratively assign the reliability to the edge.

2. The plan coordination apparatus according to claim 1, wherein the processor is further configured to:
accept a plan alteration request to increase a production volume of a product B from a business operator A, identify a component C included in the product B from the product data, judge that the plan can be altered if a delivery date and an automatically adjustable volume disclosed in plan data by a business operator D delivering the component C to the business operator A meet an additional order volume of the component C and its delivery date resulting from a plan alteration of the business operator A, and subsequently judge whether the plan can be altered for all components included in the product B.

3. The plan coordination apparatus according to claim 1, wherein the processor is further configured to:

accept a plan alteration request to increase a production volume of a product B from a business operator A, identify a component C included in the product B from the product data, identify the business operators that are linked to the business operator A by an edge and capable of supplying the component C as alternative business operators in order of decreasing reliability in a case where a delivery date and an automatically adjustable volume disclosed in plan data by a business operator D delivering the component C to the business operator A fail to meet an additional order volume of the component C and its delivery date resulting from a plan alteration of the business operator A, and identify the business operators that are not linked to the business operator A by an edge and are capable of supplying the component C as alternative business operators in order of decreasing reliability in a case where no alternative business operator can be identified among the business operators linked to the business operator A by an edge.

4. The plan coordination apparatus according to claim 1, wherein the processor is further configured to:

control to display a directed graph representing relations between the business operators centering around a particular business operator and an influence caused by the plan alteration near edges of the directed graph.

5. A plan coordination method comprising the steps of:

by a computer, registering each business operator to be managed as a node including a business operator type and product information and store, in a first database, value chain data that connects the nodes to each other by using an edge that is assigned a reliability index value for order placement/receipt-relation in association with a track record of order placement/receipt-relation between the business operators;

by the computer, storing, in a second database, components included in a new product and quantities of the components as product data in Bill of Material (BOM) format, the components and the quantities of the components being reported by each of the business operators before a production plan of the new product is drafted;

by the computer, storing, in a third database, plan data disclosing a product delivery plan between the business operators and automatically adjustable volumes indicating a maximum possible increase in production volume in addition to a scheduled production volume, the product delivery plan and the automatically adjustable volumes being reported by each of the business operators when a schedule is drafted to produce and deliver a product;

by a processor, recalculating reliability of order placement/receipt-relation between the business operators each time a new track record of product order placement/receipt-relation is collected, updating the reliability, and assigning the reliability to the edge in the first database;

by the processor, accepting a plan alteration request from one of the business operators to be managed, referring to automatically adjustable volumes of the product data, the value chain data, and the plan data from respective databases, judging whether a related business operator can alter the plan, identifying an alternative business operator, giving a notification of the alteration of the plan to the business operator, and altering the plan data in the third database;

by the processor, automatically activating track record data collection and collecting a track record of order placement/receipt-relation between the business operators at every individually specified update cycle for each of a plurality of track records, simultaneously collecting delivery date-meeting information, defect rate information, and placed/received order count data used to calculate reliability for order placement/receipt-relation between the business operators, and recording these pieces of data to a fourth database together with past history;

by the processor, automatically registering each of the business operators to be managed in a node information table of the first database together with its final product ID;

by the processor, automatically defining, in a case where a new track record of product order placement/receipt-relation between the business operators is collected, a new edge connecting the nodes of the business operators to each other in an edge information table of the first database;

by the processor, each time a new track record of order placement/receipt-relation is collected between existing business operators, iteratively recalculating reliability of order placement/receipt-relation between the business operators on a basis of the track record data, iteratively updating the reliability, and iteratively assigning the reliability to the edge.

6. The plan coordination method according to claim 5, further comprising the steps of:

by the processor, accepting a plan alteration request to increase a production volume of a product B from a business operator A, identify a component C included in the product B from the product data, judging that the plan can be altered if a delivery date and an automatically adjustable volume disclosed in plan data by a business operator D delivering the component C to the business operator A meet an additional order volume of the component C and its delivery date resulting from a plan alteration of the business operator A, and subsequently judging whether the plan can be altered for all components included in the product B.

7. The plan coordination method according to claim 5, further comprising the steps of:

by the processor, accepting a plan alteration request to increase a production volume of a product B from a business operator A, identify a component C included in the product B from the product data, identifying the business operators that are linked to the business operator A by an edge and capable of supplying the component C as alternative business operators in order of decreasing reliability in a case where a delivery date and an automatically adjustable volume disclosed in plan data by a business operator D delivering the component C to the business operator A fail to meet an additional order volume of the component C and its delivery date resulting from a plan alteration of the business operator A, and identifying the business operators that are not linked to the business operator A by an edge and are capable of supplying the component C as alternative business operators in order of decreasing reliability in a case where no alternative business operator can be identified among the business operators linked to the business operator A by an edge.

8. The plan coordination method according to claim 5, further comprising the step of:

controlling to display a directed graph representing relations between the business operators centering around a particular business operator and an influence caused by the plan alteration near edges of the directed graph.

\* \* \* \* \*